United States Patent [19]

Momoki

[11] Patent Number: 5,698,841

[45] Date of Patent: Dec. 16, 1997

[54] OPTICAL APPARATUS HAVING A FOCUS DETECTING DEVICE WITH DECENTRATION POSITION DETECTION

[75] Inventor: Kazuhiko Momoki, Yokohama, Japan

[73] Assignee: Canon Kabushiki Kaisha, Tokyo, Japan

[21] Appl. No.: 677,354

[22] Filed: Jul. 5, 1996

[30] Foreign Application Priority Data

Jul. 7, 1995 [JP] Japan .................................. 7-195835

[51] Int. Cl.⁶ ........................................................ G01J 1/20
[52] U.S. Cl. .................................. 250/201.2; 250/201.4; 396/79
[58] Field of Search .................. 250/201.2, 201.4, 250/201.5; 396/79, 80, 82, 111, 114; 359/698, 819, 822, 554–557

[56] References Cited

U.S. PATENT DOCUMENTS

| 4,473,287 | 9/1984 | Fukuhara et al. ........... 396/93 |
| 4,812,868 | 3/1989 | Utagawa et al. ............ 396/93 |
| 4,864,339 | 9/1989 | Gross et al. ............... 396/52 |
| 4,912,493 | 3/1990 | Tanaka ..................... 396/93 |
| 5,069,537 | 12/1991 | Kitagishi .................. 359/557 |
| 5,276,318 | 1/1994 | Hirasawa ................. 250/201.4 |

FOREIGN PATENT DOCUMENTS

| 63-172110 | 7/1988 | Japan . |
| 5-158100 | 6/1993 | Japan . |

*Primary Examiner*—Que Le
*Attorney, Agent, or Firm*—Fitzpatrick, Cella, Harper & Scinto

[57] ABSTRACT

An optical apparatus provided with a light receiving device for receiving light distributions from light beams passed through different portions of a pupil of a main imaging lens, a focus state detecting device for detecting the focus state of the main imaging lens from the positional relation between the light distributions received by the light receiving device, a decentration position detecting device for detecting the decentration position of a decenterable lens provided in the main imaging lens, a memory for memorizing inherent data of the main imaging lens which should correct the focus state detection output at each decentration position, and a calculating device for calculating the amount of movement of a focusing lens for focusing by the use of the inherent data read out from the memory conforming to a signal from the decentration position detecting device and the focus state detection output.

6 Claims, 7 Drawing Sheets

OPTICAL APPARATUS HAVING A FOCUS DETECTING DEVICE WITH DECENTRATION POSITION DETECTION

BACKGROUND OF THE INVENTION

1. Field of the Invention

This invention relates to an optical apparatus having a focus detecting device, and particularly to an optical apparatus having a focus detecting device suitable for a case where the focus position of a main imaging lens having a decenterable lens for correcting image vibration occurring when an optical system such as the photo-taking lens of a photographic camera or a video camera or another lens vibrates or a tilt lens (eccentrically movable lens) for tilting some lenses by a tilt mechanism is automatically detected by the positional relation of a secondary image and focusing is effected.

2. Related Background Art

Various cameras having focus detecting devices have heretofore been proposed. Among these, for example, in Japanese Patent Application Laid-Open No. 63-172110, there is proposed, in a focus detecting device wherein a field lens is disposed on the predetermined imaging plane of a main imaging lens such as a photo-taking lens or near a position equivalent thereto and a secondary imaging optical system is disposed rearwardly thereof and an object image formed on the predetermined imaging plane or near the position equivalent thereto is further separated into a plurality of secondary images and the plurality of secondary images are received by a plurality of light receiving means and the positional relation on the surfaces of the light receiving means among the plurality of secondary images is found to thereby obtain the focus position of the main imaging lens (the amount of defocus from the predetermined imaging plane), an optical apparatus in which the difference between the focus position calculated by the focus detecting device and the best focus position of the main imaging lens is stored as the inherent information (inherent data) of the main imaging lens by the memory portion of the main imaging lens and the amount of movement of a focusing lens is corrected so that the best focus position may be provided during photographing. As related art, there is U.S. Pat. No. 4,473,287.

In the optical apparatus having such a focus detecting device, there is a case where if the stored information is inherent information to a single object distance within the entire focus range, it is not the best focus position to other object distances.

So, in order to solve this problem, there has been proposed an optical apparatus in which the focus position is divided into a plurality of areas and inherent information is given to each focus zone so that substantially the best focus may be obtained over the entire focus range.

In these systems, the accuracy of focusing is improved in the lens system or the like of a coaxial system in which the movement of the lens does not take place in any direction other than the direction of the optical axis.

However, in a lens system having a lens decenterable relative to the optical axis (eccentrically movable lens), for example, a lens system having an anti-vibration lens having a vibration (blur), correcting function or a lens having a swing and tilt mechanism for tilt, shift or the like (a swing and tilt lens), inherent information stored in a memory portion is information relative to an undecentered standard state and therefore, there is a problem that it is not the best focus position relative to a decentration state.

Particularly in a zoom lens, it is difficult to correct aberrations over the entire zoom area during decentration, and there is a problem that it is particularly difficult to suppress the occurrence of movement of the image field, curvature of the image field, etc. resulting from decentration.

SUMMARY OF THE INVENTION

It is the object of the present invention to provide an optical apparatus having a focus detecting device in which even when at least some lens in a main imaging lens is a decenterable lens (eccentrically movable lens), the error of the lens drive amount corresponding to the difference between the best focus correction inherent value in the standard state of the decenterable lens and the best focus correction inherent value in a desired decentered position can be corrected to thereby improve the accuracy of focusing.

The present invention is provided with light receiving means for receiving light distributions from light beams passed through the different portions of the pupil of a main imaging lens, focus state detecting means for detecting the focus state of the main imaging lens from the positional relation between the light distributions received by the light receiving means, decentration position detecting means for detecting the decentration position of a decenterable lens provided in the main imaging lens, memory means for memorizing the inherent data of the main imaging lens which should correct the focus state detection output at each said decentration position, and calculating means for calculating the amount of movement of a focusing lens for focusing by the use of the inherent data read from the memory means and the focus state detection output.

DESCRIPTION OF THE PREFERRED EMBODIMENTS

Description will first be made of a method of moving the focusing lens of a main imaging lens in the present invention.

Figure 8A:
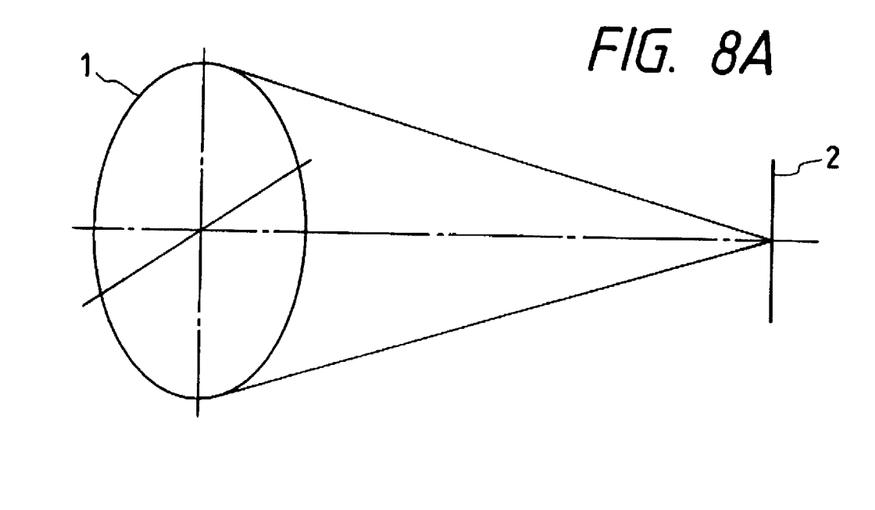
FIGS. 8A and 8B show the construction of the essential portions of a focus detecting device of the pupil division type according to the prior art.
Figure 8B:
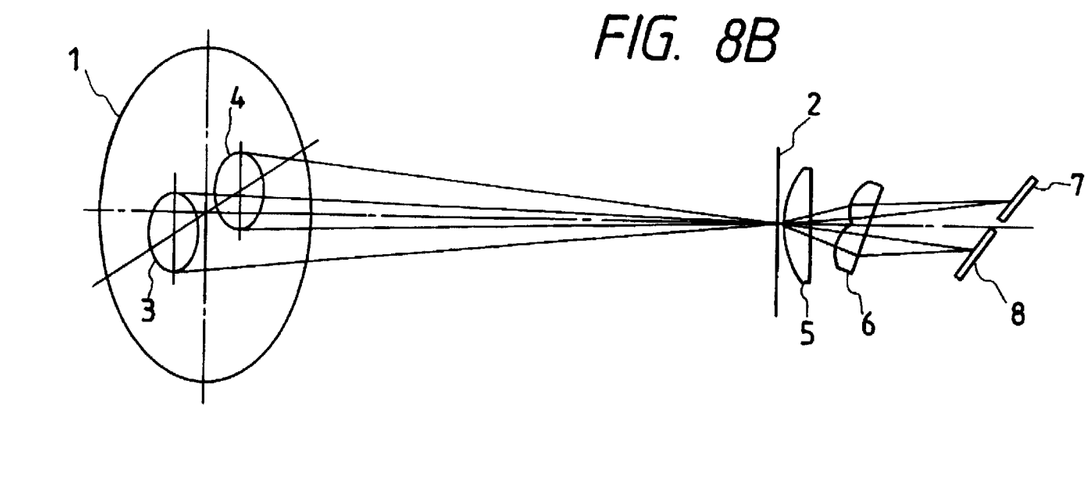

FIGS. 8A and 8B show the construction of the essential portions of a focus detecting device. As shown in FIG. 8A, a light beam passed through the pupil 1 of a main imaging lens in the opening thereof is imaged on a predetermined imaging plane 2 if the lens is in focus. At this time, as shown in FIG. 8B, light beams passed through pupils 3 and 4 divided into two form object images on (a position equivalent to) the predetermined imaging plane 2, whereafter secondary images are formed on a pair of light receiving elements 7 and 8 by a field lens 5 and a secondary imaging lens 6 disposed near the predetermined imaging plane 2.

When the main imaging lens is out of focus, the positional relation between the secondary images on the light receiving elements 7 and 8 differs from the standard positional relation when the main imaging lens is in focus and therefore, the focus position (defocus amount) can be detected (calculated) on the basis of the deviation between the phases of the image signals of the light receiving elements 7 and 8.

Now, in a focus detecting device of such a type, an accurate focus position detection is established when the main imaging lens is an ideal no-aberration lens, and when there are aberrations in the main imaging lens, it happens that a difference occurs between a calculated focus position and the actual best focus position of the main imaging lens and the main imaging lens will be more or less out of focus even if the calculated focus position is made coincident with the predetermined imaging plane 2.

Figure 9A:
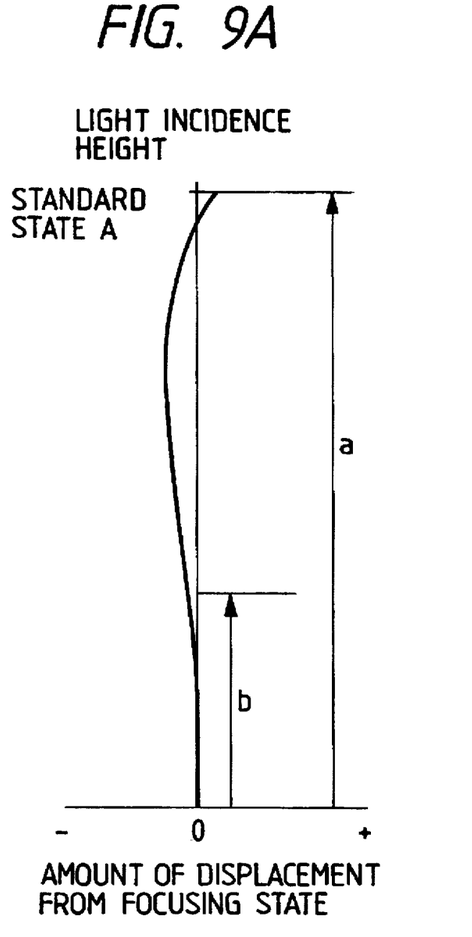
FIGS. 9A and 9B are illustrations showing the spherical aberration of the main imaging lens of the device of FIGS. 8A and 8B.
Figure 9B:
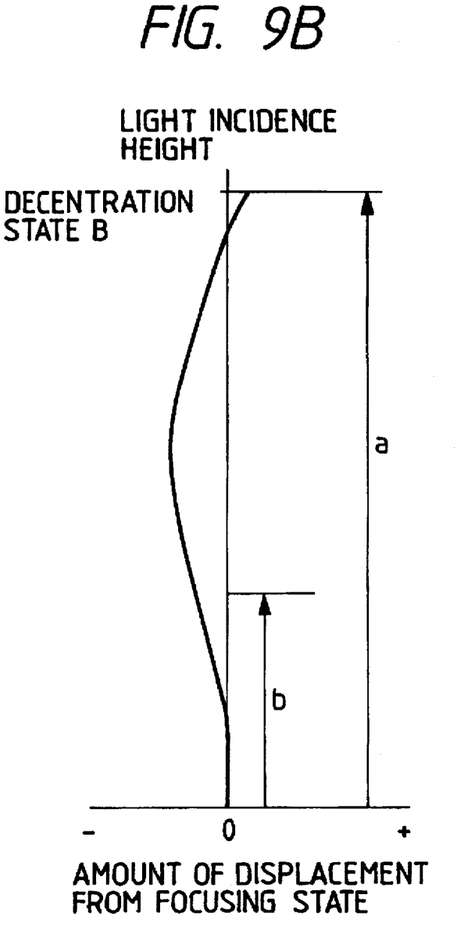

For example, in the case of a main imaging lens in which, as shown in FIGS. 9A and 9B, spherical aberration is not completely corrected, spherical aberration corresponding to the open diameter of the pupil 1 becomes a and spherical aberration corresponding to the small diameter of the divided pupil 3 or 4 becomes b and therefore, focus positions in which contrast becomes best become different from one another. This means that there is a case where, since the spectral sensitivity characteristic of a sensitive material used for popular photographic lenses and the spectral sensitivity characteristic of a light receiving element used in a focus detecting device differ from each other, the focus position differs also in a main imaging lens in which the correction of not only spherical aberration but also chromatic aberration is not complete.

Thus, if the difference between the focus position corresponding to the spherical aberration a and the focus position corresponding to the spherical aberration b, including the difference in the focus position by the influence of chromatic aberration, is memorized as the inherent information of the main imaging lens by the memory portion of the main imaging lens, this can be called out during photographing and the amount of movement of the focusing lens can be corrected to thereby obtain the best focus position.

However, as shown in FIGS. 9A and 9B, the difference between two states A and B causes fluctuations of aberrations such as eccentric coma and eccentric curvature of image field. At this time, the focus position corresponding to the spherical aberration a changes greatly as compared with the focus position corresponding to the spherical aberration b. Thus, the difference between the focus positions corresponding to the spherical aberration a and the spherical aberration b also changes greatly. There will be no problem if this difference is sufficiently within an allowable depth of image field, but yet in a zoom lens, it is different to correct these eccentric aberrations over an entire zoom range. Also, in a main imaging lens wherein the Mount of eccentricity is great, the above-mentioned eccentric aberrations, and particularly the fluctuation of the image field, become great and the correction thereof is difficult. Further, in a lens affecting swing and tilt such as tilt (a swing and tilt lens), the fluctuation of the image field is unavoidable in the properties thereof.

So, the present invention, in order to obtain the best focus without depending on a decentration state in such a lens, adopts a system whereby the decentration position of an eccentrically movable lens is divided into a plurality of areas and for each decentration zone, said inherent information is memorized by the memory portion (memory means) of the main imaging lens, and this is called out during photographing and the amount of movement of the focusing lens is calculated and corrected.

Figure 1:
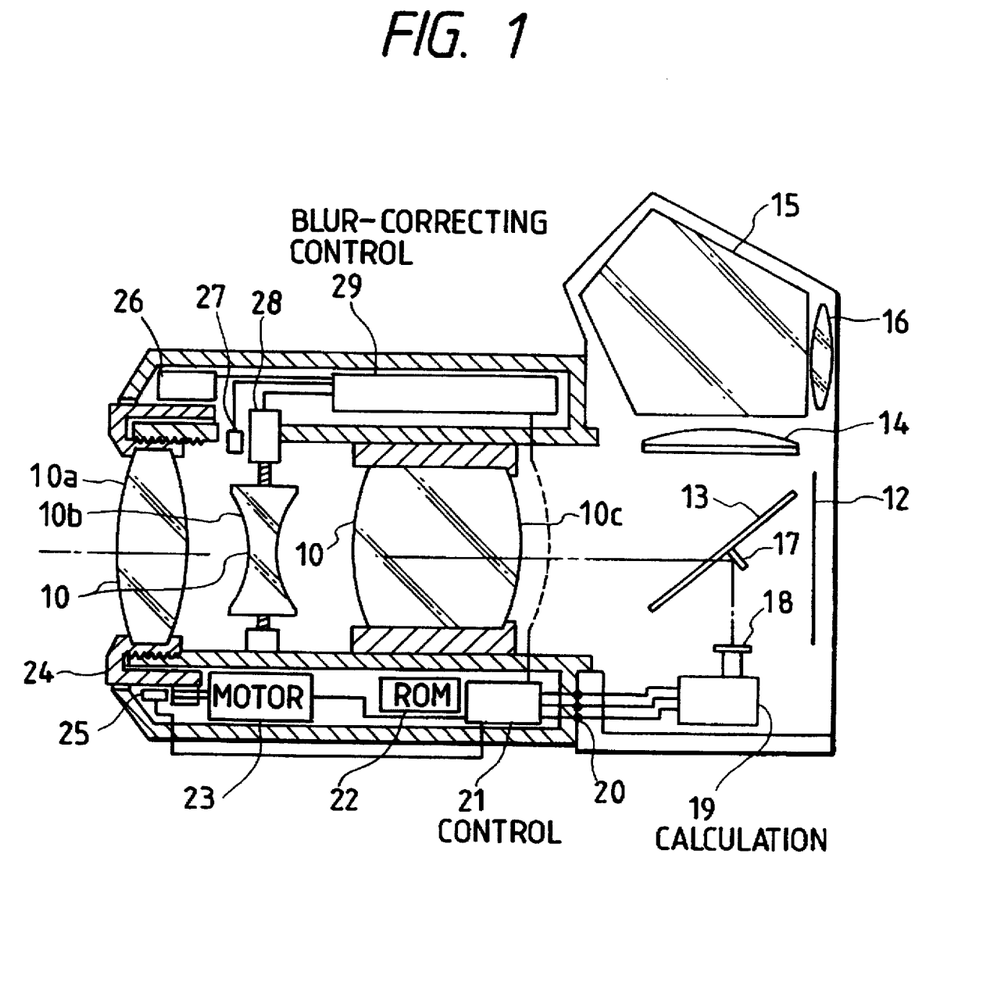
FIG. 1 is a cross-sectional view showing the essential portions of Embodiment 1 of the present invention.

FIG. 1 is a schematic view of the essential portions of Embodiment 1 when applied to a single-lens reflex camera as an optical apparatus with respect to the movement of the focusing lens of a main imaging lens using this system.

In FIG. 1, a photo-taking lens 10 comprising a focusing lens (focusing portion) 10a, an anti-vibration lens (eccentrically movable lens) 10b and a variable power lens (zoom portion) 10c corresponds to a main imaging lens according to the present invention. Although not shown, there is detecting means for detecting the positions of the zoom portion and the focusing lens portion; and aberrations, particularly spherical aberration, fluctuate depending on the zoom position and focus position, and of course, such positional information is taken into account.

Photographing is effected by the object light passed through the main imaging lens being imaged on a film surface 12. The film surface 12 corresponds to the predetermined imaging plane. When, at that time, for example, hand vibration (displacement) or the like is present, the vibration is detected by vibration detecting means (image blur sensor) 26 and calculation is effected by blur-correcting control means 29, and the anti-vibration lens 10b is decentered (parallel-decentered and/or pivotally decentered) from the optical axis, whereby the position of the image on the film surface 12 is controlled so as to become stable.

The observation of the field of view (object) is effected through the main imaging lens 10, a reflecting mirror 13, a condenser lens 14, a pentagonal prism 15 and an eyepiece 16. At that time, as during the above-described photographing, the stable object image by the blur-correcting control means 29 is observed.

During focus detection, the object light passed through the main imaging lens 10, transmitted through the partial half-transmitting portion of the reflecting mirror 13 and reflected by a distance measuring mirror 17 is separated by a field lens and a secondary imaging optical system, not shown, and is received by a light receiving element 18, and the image signal of the light receiving element 18 is converted into a digital signal, and the focus position (defocus amount) is calculated in calculating means 19. Again in this case, as during the above-described photographing and during the observation of the field of view, focus detection is effected by the stable image by the blur-correcting control means 29.

The calculating means 19 corresponds to the calculating means of the present invention and includes the correcting means of the present invention.

On the main imaging lens (photo-taking lens) 10 side, there are provided control means 21 on the lens side connected to the calculating means 19 on the camera side by a contact 20, a ROM 22 corresponding to the memory means according to the present invention, a drive motor 23 for moving a focusing lens 10a in the direction of the optical axis, and decentration position detecting means 27 for detecting the decentration position of an anti-vibration lens 10b.

The ROM 22 stores therein data regarding the focus difference between a focus position calculated by the calculating means 19 and the best focus position of the main imaging lens 10 corresponding to each decentration state as the inherent data (inherent information) of the main imaging lens.

This inherent data is stored specifically as the function of the amount of decentration of the decenterable lens, the focus amount, the lens drive amount and the pulse number counted by a pulse counter for controlling the focusing lens.

The calculating means 19 sends a data-read-command to the control means 21 on the lens side when it calculates a corrected focus position, and the control means 21 on the lens side receives decentration position information from the decentration position detecting means 27 of the anti-vibration lens 10b, reads the data of the aforementioned focus difference corresponding to the decentration position and sends this data to the calculating means 19. The calculating means 19 corrects and calculates the calculated focus position by referring to the aforementioned data, and sends it as a lens drive pulse to the control means 21 on the lens side.

The control means 21 on the lens side drives the drive motor 23 correspondingly to the lens drive pulse. A helicoid 24 is moved by the driving of the drive motor 23 and along therewith, the focusing lens 10a is moved to thereby effect focusing. A pulse counter 25 as lens position detecting means counts a pulse outputted from a pattern formed on the helicoid 24, and when this count value coincides with the lens drive pulse, the control means 21 on the lens side judges that lens drive of the commanded amount has been effected.

Figure 2:
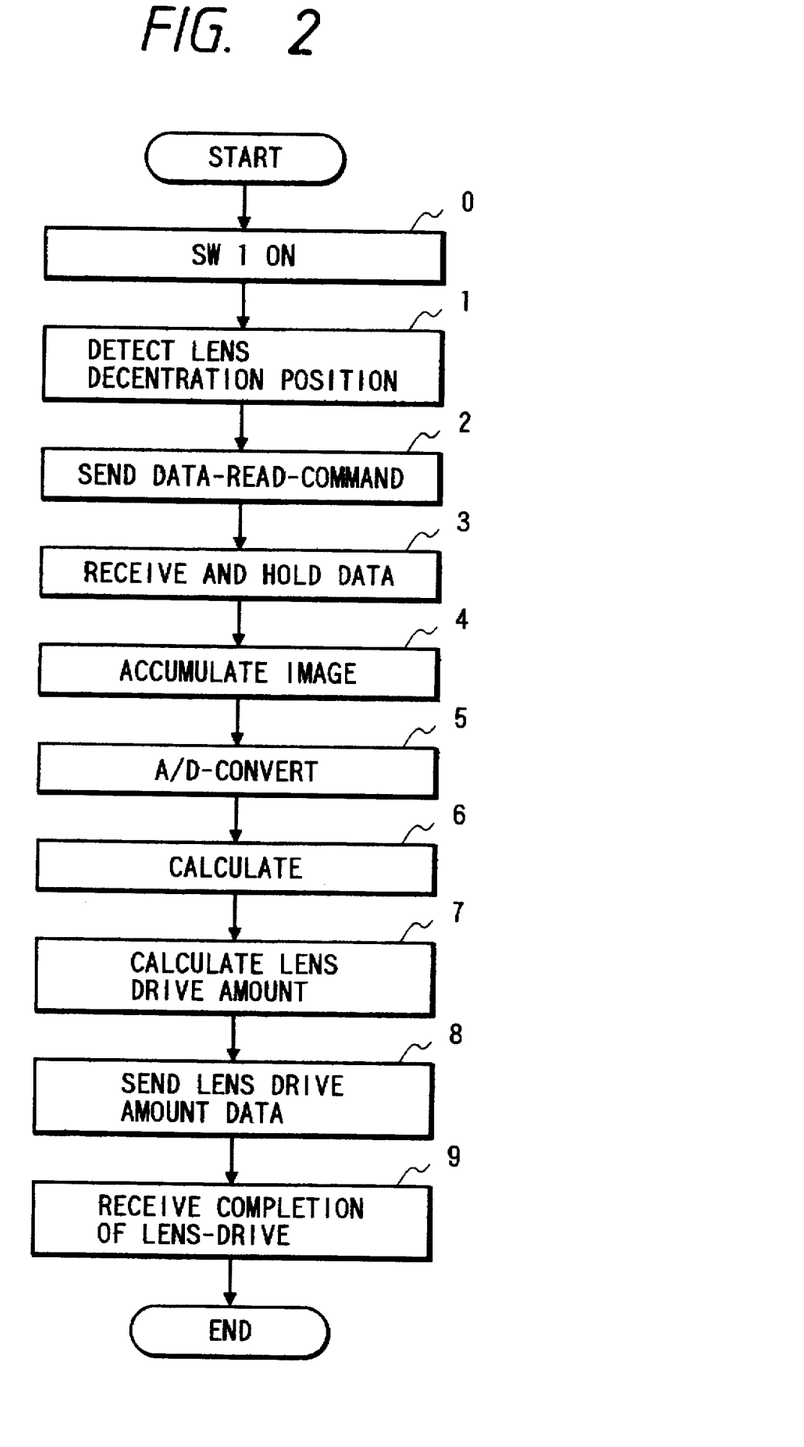
FIG. 2 is a flow chart showing the operation of calculating means in Embodiment 1 of the present invention.

The calculation substance of the calculating means 19 will now be described in detail with reference to the flow chart of FIG. 2.

First, at a step 0, the focus detecting operation is started upon the closing of a photometry switch SW1 by the half depression (a first stroke) of a release button. At a step 1, decentration information is detected by the decentration position detecting means 27, and at a step 2, a data-read-command is sent to the control means 21 on the lens side. At a step 3, the control means 21 on the lens side receives the decentration position information from the decentration position detecting means 27 of the anti-vibration lens 10b through the blur-correcting control means 29, and reads out the data (def$_b$) of the aforementioned focus difference corresponding to the decentration position from the ROM 22 and sends it to the calculating means 19, and temporarily holds this data in a memory contained in the calculating means 19.

At a step 4, the photoelectric conversion of a secondary image is effected by the light receiving element 18 for a predetermined time and the image is accumulated. At a step 5, the accumulated image signal is converted into a digital signal by an A/D converter. At a step 6, on the basis of this digital signal, a standard defocus amount (def$_o$) is calculated and memorized. Subsequently, the data (def$_b$) of the aforementioned focus difference is added to the calculated standard defocus amount (def$_o$) and the defocus amount (def) after correction is calculated.

That is, $$def = def_o + def_b \qquad (1)$$

is calculated.

At a step 7, the conversion of the defocus amount (def) after correction into a lens drive amount (x) is effected. That is, $$def \rightarrow x$$

is effected.

At a step 8, the lens drive amount information is sent to the control means 21 on the lens side. Subsequently, at a step 9, the control means 21 on the lens side drives the focusing lens, and receives a lens-drive completion signal, thus terminating the focus detecting operation.

Figure 3:
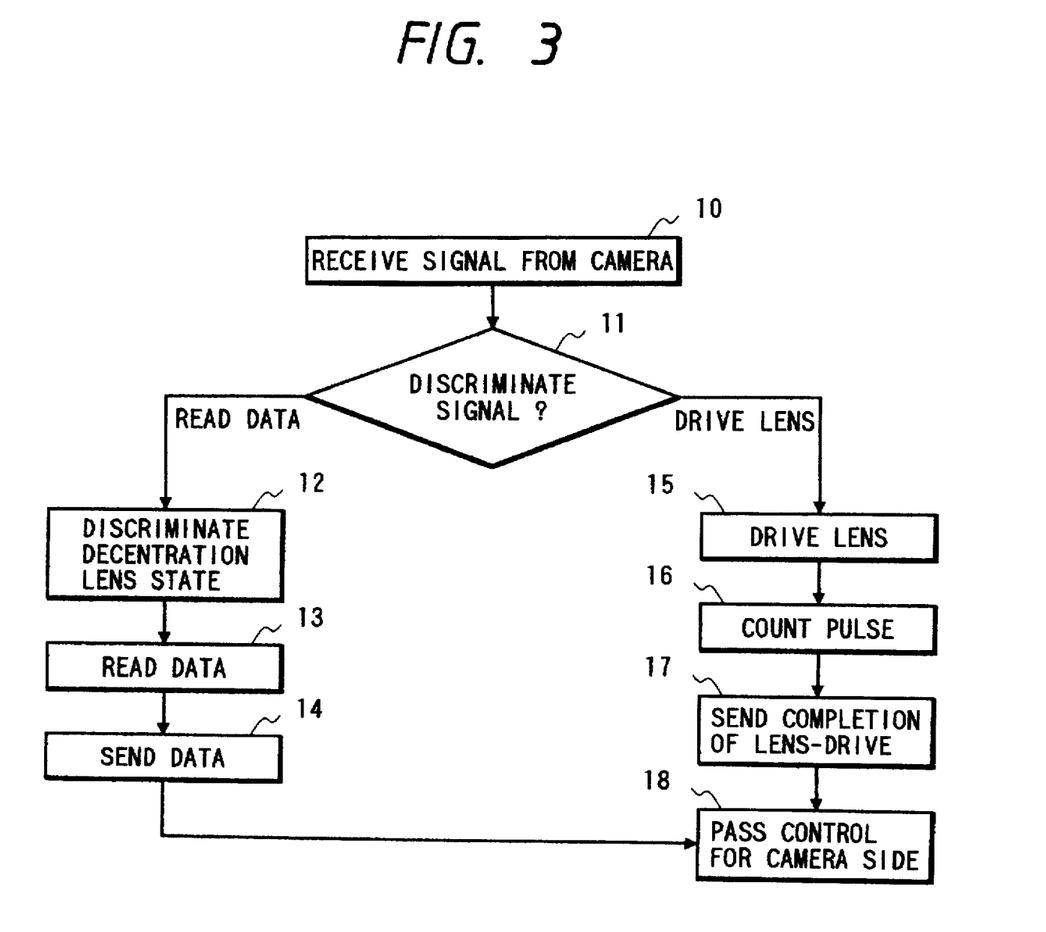
FIG. 3 is a flow chart showing the operation of control means on the lens side in Embodiment 1 of the present invention.

FIG. 3 shows a flow chart of the operation of the control means 21 on the lens side.

In the flow chart, when at a step 10, a signal from the camera is received, the signal is discriminated at a step 11. When the signal is a data-read-command, at a step 12, the decentration position of the anti-vibration lens 10b is detected, and at a step 13, the information of the focus difference is read out from the ROM 22 with the detected decentration position as reference, and at a step 14, data for correction lens drive is sent to the calculating means from the lens drive amount signal sent from the calculating means 19 and the information of the focus difference read out from the ROM 22 from the decentration position detected at the step 13, and at a step 18, the control is passed to the camera side.

On the other hand, when at the step 11, the signal from the camera is a lens drive signal alone, advance is made to a step 15, where the drive motor 23 is electrically energized. At a step 16, when it is detected that the pulse counter 25 has counted a pulse number corresponding to the lens drive amount, the drive motor 23 is electrically deenergized. At a step 17, a lens-drive completion signal is sent to the camera side, and at the step 18, the operation is terminated.

A system according to the conventional art differing from the correcting means of the present invention will now be described. Regarding two lens states, i.e., a decentration standard state A and a decentration state B, the data of the aforementioned focus difference are def$_a$ and def$_b$. That is, the fluctuation amount def$_{ab}$ by decentration is $$\Delta def_{ab} = def_a - def_b$$

If this fluctuation amount $\Delta def_{ab}$ is within the allowable depth of image field practically free of a problem, there will be no problem, but in, ordinary lenses, and particularly zoom lenses or the like, this fluctuation amount $\Delta def_{ab}$ becomes an amount which cannot be neglected. So, in order to solve this problem, the aforedescribed correcting means is used in the present invention.

In the present embodiment, when blur correction is being effected, the eccentrically movable lens (anti-vibration lens) is constantly changing its decentration position and therefore, it is thinkable that relative to the focus detected position, defocus corresponding to the above-described fluctuation amount $\Delta def_{ab}$ occurs during photographing.

However, generally, the displacement of the blur of a high frequency is small and the fluctuation amount $\Delta def_{ab}$ falls within the allowable depth of image field. Conversely, in the case of a low frequency, the displacement of the blur is great, but by shortening the interval between the focus detecting operations, the fluctuation amount $\Delta def_{ab}$ can be made to fall within the allowable depth of image fields. Also, by controlling the amount of decentration movement of the eccentrically movable lens, it is easy to make the fluctuation amount $\Delta def_{ab}$ fall within the allowable depth of image field.

Thus, in the present embodiment, even if as described above, at least some lens of the main imaging lens is a decenterable lens, the error of the lens drive amount corresponding to the difference between the best focus correction inherent value in the standard state of this lens and the best focus correction inherent value at the desired decentration position is corrected to thereby improve the accuracy of focusing.

Figure 4:
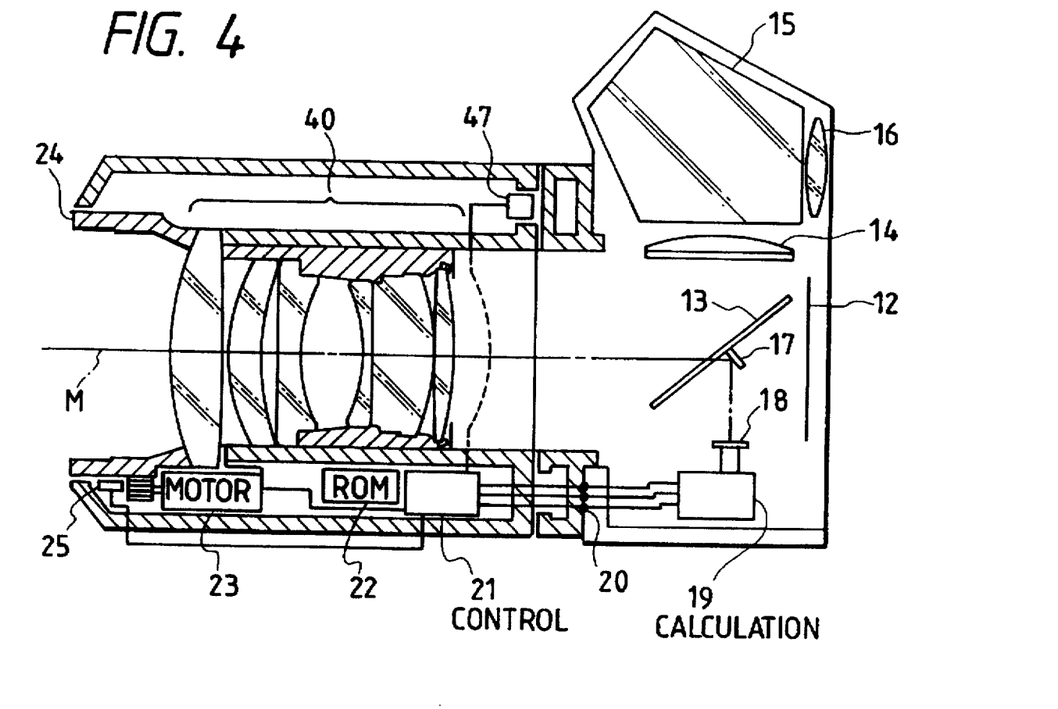
FIG. 4 is a cross-sectional view of essential portions showing the standard state of Embodiment 2 of the present invention.
Figure 5:
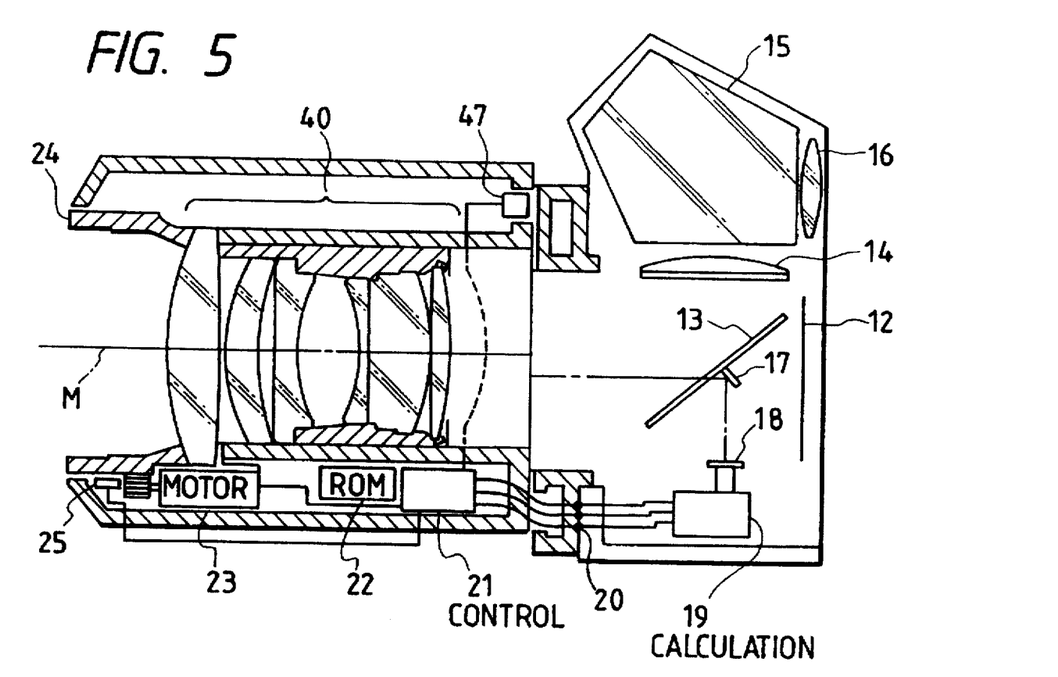
FIG. 5 is a cross-sectional view of essential portions showing the decentration state of Embodiment 2 of the present invention.

FIGS. 4 and 5 are schematic views of the essential portions of Embodiment 2 when the present invention is applied to a single-lens reflex camera provided with a shift mechanism. In FIGS. 4 and 5, the same elements as those in FIG. 1 are given the same reference numerals.

In these figures, reference numeral 40 designates a main imaging lens (photo-taking lens), the whole of which is designed to be capable of being parallel-moved in a direction orthogonal to the optical axis M. The reference numeral 47 denotes decentration position detecting means which detects the decentration position (shift position) of the main imaging lens 40.

FIG. 4 shows the standard state in which the optical axis M is coincident with the center of the film surface 12, and FIG. 5 shows the decentration state in which the main imaging lens 40 has been parallel-moved upwardly in the direction orthogonal to the optical axis M. In these two states, there are not the fluctuations of aberrations by decentration and therefore, if the focus is adjusted in the standard state and thereafter, a shift is effected, no defocus will occur.

However, the shift must be effected in the state of focus lock, and this means a problem that operability is bad. Also, if focusing is effected after the shift has been effected, the positions of aberrations will move although there are no fluctuations of aberrations and therefore, that movement will result in the defocus corresponding to the aforementioned fluctuation amount $\Delta def_{ab}$.

So, in the present embodiment, the data of the aforementioned focus difference corresponding to the decentration information from the decentration positiondetecting means 47 is read out from the ROM 22 and focus correction is effected to thereby obtain an effect similar to that of the aforedescribed Embodiment 1.

The operations such as focus detection and focus correction are similar to those in the aforedescribed Embodiment 1.

Also, the focusing in the present embodiment is effected by whole axial movement, but even when it is effected by a partial optical system (lens), there can be obtained an effect equal to that of the aforedescribed embodiment.

Figure 6:
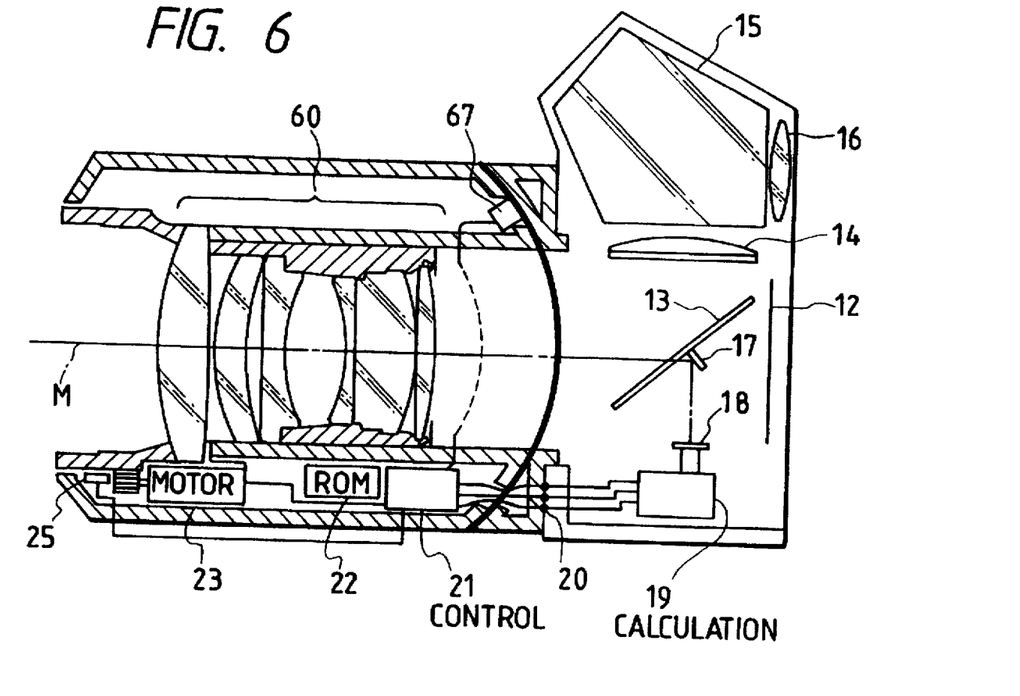
FIG. 6 is a cross-sectional view of essential portions showing a standard state of Embodiment 3 of the present invention.
Figure 7:
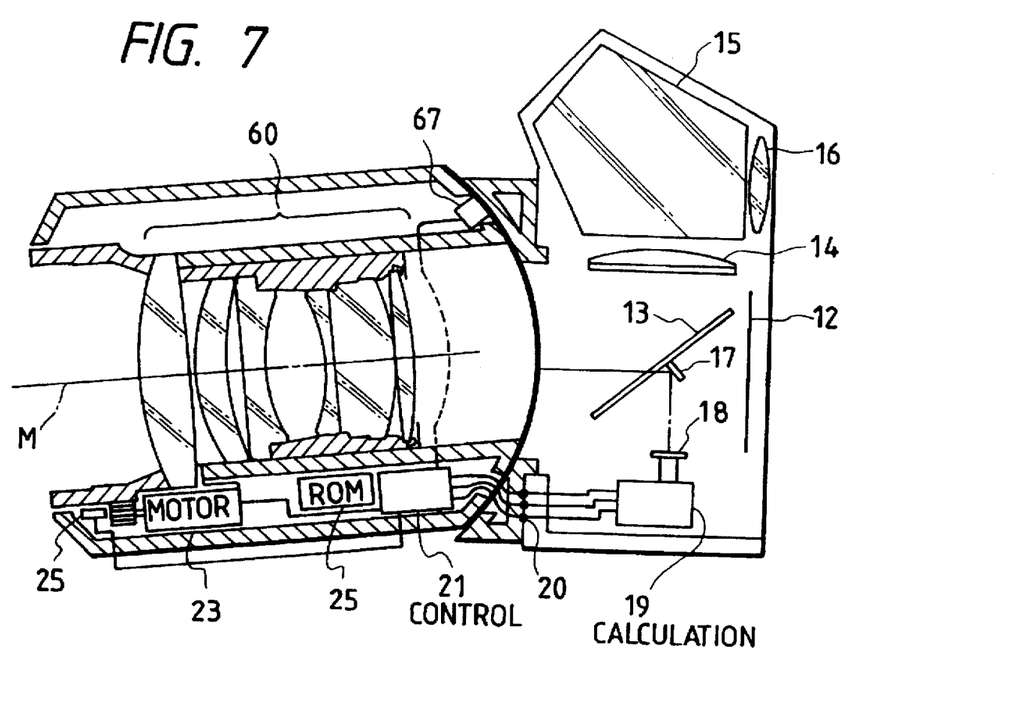
FIG. 7 is a cross-sectional view of essential portions showing the decentration state of Embodiment 3 of the present invention.

FIGS. 6 and 7 are schematic views of the essential portions of Embodiment 3 when the present invention is applied to a single-lens reflex camera provided with a tilt mechanism. In FIGS. 6 and 7, the same elements as those shown in FIG. 1 are given the same reference numerals.

In these figures, the reference numeral 60 designates a main imaging lens, the whole of which is designed to be capable of being rotationally moved (tilted) about any one point on the optical axis. The reference numeral 67 denotes decentration position detecting means which detects the decentration position (tilt position) of the main imaging lens 60.

FIG. 6 shows the standard state in which the optical axis M is coincident with the center of the film surface 12, and FIG. 7 shows the decentration state in which the object side of the main imaging lens 60 has been tilted downwardly.

The main imaging lens 60 in the present embodiment is for inclining the image plane by tilting, and suffers from the problem that in the two states, particularly the aberration fluctuations of the image plane become great.

So, in the present embodiment, the data of the aforementioned focus difference corresponding to the decentration information from the decentration position detecting means 67 is read out from the ROM 22 and focus correction is effected to thereby obtain an effect similar to that of the aforedescribed Embodiments 1 and 2.

The operations such as focus detection and focus correction are similar to those in the aforedescribed Embodiment 1.

Even when focusing and tilting are effected by some lens of the main imaging lens 60, an effect equal to that of the aforedescribed embodiments can be obtained in the present embodiment.

Also, in the present embodiment, an actuator may be provided in the tilt mechanism and swing and tilt may be automatically done, and in this case, focus correction can be effected at multiple points on the image plane.

If, in the above-described Embodiments 1 to 3, the respective decentration detecting means are installed in two directions orthogonal to each other from the asymmetry of decentration and the data of the aforementioned focus difference is provided by matrices corresponding to the two directions orthogonal to each other, the accuracy of focusing can preferably be further improved.

Also, the data of the aforementioned focus difference changes in proportion to the amount of decentration when the amount of decentration is small and therefore, it can be approximated by a simple expression. Also, to make the data of the ROM small, it is effective to have the data of the aforementioned focus difference as the coefficient of a function.

While, in the present embodiment, the control means 1 on the lens side is provided on the main imaging lens 10 side, the control means 21 on the lens side may be excluded from the lens 10 side so that the control thereof may all be effected on the camera side, and the drive motor 23 also may be disposed on the camera side. Also, while in the present embodiment, a pulse counter is used as the lens position detecting means, for example, a gray pattern may be provided on the helicoid and the pattern may be read.

According to the present invention, as previously described, there can be achieved an optical apparatus having a focus detecting device in which even if at least some lens of the main imaging lens is a decenterable lens (eccentrically movable lens), the error of the lens drive amount corresponding to the difference between the best focus correction inherent value of the decenterable lens in the standard state and the best focus correction inherent value at a desired decentration position can be corrected to thereby improve the accuracy of focusing.

What is claimed is:

1. An optical apparatus having a focus detecting device, said apparatus comprising:
   a main imaging lens;
   light receiving means for receiving light distributions from light beams passed through different positions of the pupil of said main imaging lens;
   focus state detecting means for detecting the focus state of said main imaging lens from the positional relation between the light distributions received by said light receiving means;
   decentration position detecting means for detecting the decentration position of a decenterable lens provided in said main imaging lens;
   memory means for memorizing inherent data of said main imaging lens which should correct a focus state detection output at each said decentration position; and
   correcting means for correcting the amount of movement of a focusing lens for focusing by the use of the inherent data read out from said memory means conforming to a signal from said decentration position detecting means and the focus state detection output.

2. An optical apparatus having a focus detecting device according to claim 1, wherein said inherent data is memorized as a function of the decentration amount of said decenterable lens.

3. An optical apparatus having a focus detecting device according to claim 1, further comprising blur detecting means and wherein said decenterable lens is decentered on the basis of a signal from said blur detecting means to thereby correct the blur of an image.

4. An optical apparatus having a focus detecting device according to claim 1, wherein said inherent data is memorized as an amount for obtaining an in-focus state.

5. An optical apparatus having a focus detecting device according to claim 1, wherein said inherent data is memorized as a lens drive amount.

6. An optical apparatus having a focus detecting device according to claim 1, wherein said inherent data is memorized as a pulse number counted by a pulse counter for controlling a focusing lens provided in said main imaging lens.

* * * * *

UNITED STATES PATENT AND TRADEMARK OFFICE
CERTIFICATE OF CORRECTION

PATENT NO. : 5,698,841
DATED : December 16, 1997
INVENTOR(S) : KAZUHIKO MOMOKI

It is certified that error appears in the above-identified patent and that said Letters Patent is hereby corrected as shown below:

COLUMN 3:

Line 65, "Mount" should read --amount--.

COLUMN 4:

Line 24, "portion;" should read --portion,--.

COLUMN 7:

Line 35, "positiondetecting" should read --position detecting--.

Signed and Sealed this

Second Day of June, 1998

Attest:

BRUCE LEHMAN

*Attesting Officer*    *Commissioner of Patents and Trademarks*